United States Patent
Morisaki

(10) Patent No.: US 6,917,570 B2
(45) Date of Patent: Jul. 12, 2005

(54) MEDIUM CONTROLLER WITH SLOT-MOUNTED SENSORS

(75) Inventor: Katsuhiko Morisaki, Tokyo (JP)

(73) Assignee: NEC Corporation, Tokyo (JP)

( * ) Notice: Subject to any disclaimer, the term of this patent is extended or adjusted under 35 U.S.C. 154(b) by 40 days.

(21) Appl. No.: 10/236,906

(22) Filed: Sep. 9, 2002

(65) Prior Publication Data

US 2002/0196716 A1 Dec. 26, 2002

Related U.S. Application Data

(63) Continuation of application No. 09/669,685, filed on Sep. 26, 2000, now Pat. No. 6,515,946.

(30) Foreign Application Priority Data

Sep. 27, 1999 (JP) .......................................... 10-271539

(51) Int. Cl.⁷ .............................................. G11B 17/22
(52) U.S. Cl. .................................. 369/30.55; 369/30.27
(58) Field of Search ............................ 369/30.27, 30.55

(56) References Cited

U.S. PATENT DOCUMENTS

| 5,053,948 | A | | 10/1991 | DeClute et al. |
| 5,303,214 | A | * | 4/1994 | Kulakowski et al. ...... 369/30.3 |
| 5,613,154 | A | * | 3/1997 | Burke et al. .................... 710/1 |
| 5,820,055 | A | | 10/1998 | Leger et al. |
| 5,883,864 | A | * | 3/1999 | Saliba ...................... 360/92 X |
| 5,884,298 | A | | 3/1999 | Smith, II et al. |
| 5,940,355 | A | * | 8/1999 | Buckland et al. ......... 369/30.55 |
| 5,956,301 | A | * | 9/1999 | Dimitri et al. ...... 364/478.02 X |
| 6,023,643 | A | | 2/2000 | Jesionowski |
| 6,286,079 | B1 | * | 9/2001 | Basham et al. ............. 711/112 |
| 6,480,905 | B1 | * | 11/2002 | Jesionowski et al. .......... 710/8 |

FOREIGN PATENT DOCUMENTS

| JP | 2-146142 | 6/1990 |
| JP | 5-189935 | 7/1993 |
| JP | 6-215459 | 8/1994 |

* cited by examiner

Primary Examiner—Aristotelis M. Psitos
(74) Attorney, Agent, or Firm—Young & Thompson

(57) ABSTRACT

When a medium is stored or removed manually, all slots must be checked to find any change in medium information, and as a result, updating medium storage information takes a long time. A medium controller, having a plurality of media and a medium transfer unit to take a medium in and out of storage and move the medium for reading or writing information, includes slots in which media are stored, sensors each mounted in a slot for detecting whether there is a medium in the slot; a sensor manager for holding a log of the status transitions of the sensors in a period when media are likely to be stored or removed manually and deciding the status transitions; and a part for reading information. Only when it is decided from a decision result of the sensor manager that the medium has been replaced, the media controller causes the part for reading medium information to read medium information in order to update the medium storage information.

7 Claims, 6 Drawing Sheets

| SLOT LOCATION | MEDIUM INFORMATION |
|---|---|
| 1 | A3 |
| 2 | A5 |
| 3 | A1 |
| 4 | A2 |
| 5 | A6 |
| 6 | A4 |

FIG.6

| SLOT LOCATION | SENSOR STATUS LOG | | | |
|---|---|---|---|---|
| | 1 | 2 | 3 | 4 |
| 1 | ON | OFF | | |
| 2 | OFF | ON | | |
| 3 | ON | OFF | ON | |
| 4 | OFF | ON | OFF | |
| 5 | OFF | ON | OFF | ON |
| 6 | OFF | | | |
| 7 | ON | | | |

FIG.7

MEDIUM CONTROLLER WITH SLOT-MOUNTED SENSORS

This is a continuation of application Ser. No. 09/669,685 filed Sep. 26, 2000, now U.S. Pat. No. 6,515,946.

BACKGROUND OF THE INVENTION

The present invention relates to a medium controller for medium-exchange type memory units that is used as peripheral equipment of a computer (for example, an autoloader in a library of magnetic tape units or optical disk units).

The events, such as opening or closing of the entry/exit door, resetting or stopping power supply for the medium controller, are hereafter referred to as medium entry/exit-enable actions. When power supply is stopped or a reset button is pressed, it becomes possible to open or close the door of, the medium storage and, after that, a medium may be taken out or put into storage. This is the reason why those events are treated as the medium entry/exit-enable actions. Upon recognizing any of such events, the medium controller has medium storage information with the contents before this event automatically updated or the system site operator issues a command to have the information updated.

Conventionally, when medium storage information is to be updated automatically or by the operator issuing a command, the prior-art medium controller is unable to obtain medium entry/exit information because there is no sensor to recognize a medium in the medium storage area. As a solution, generally, the medium transfer unit (accessor) is equipped with a sensor or a bar-code reader to read a bar code on the medium and the medium transfer unit is made to access all the medium storage places (hereafter referred to as slots) where media are stored, and each time the sensor or the bar-code reader, provided for (accompanying) the accessor, recognizes a medium, the medium storage information is updated. In the prior-art medium transfer unit, each time some medium is replaced manually, the medium transfer unit accesses all medium storage places as mentioned above, taking a long time. Therefore, there is a long waiting time before the medium controller can be accessed from the system.

The conventional medium controller cannot grasp the medium storage status unless the medium transfer unit (accessor) sequentially checks all the slots; therefore, there are the following two problems.

The first problem is that, in a medium controller with a very large number of media in storage, the accessor checks every slot to see what medium is stored. This requires a long time for updating medium storage information. For this reason, in many cases, medium storage information is updated only when the operator desires. Consequently, when a medium is taken out or put into storage especially by manual operation, if the operator does not update medium storage information, it follows that the medium storage information does not match the actual storage status.

The second problem is that, in a medium controller with fewer media in storage, medium storage information is updated automatically in many cases when the condition that media are exchanged occurs, with the result that each time a medium comes in or out, the medium controller is kept waiting while the medium transfer unit is accessing all the slots and cannot perform other processing.

SUMMARY OF THE INVENTION

It is an object of the present invention to greatly reduce time for updating medium storage information when a medium entry/exit-enable action occurs during the backup operation of a computer system, particularly in the operation of the, automatic (unmanned) medium controller. This significant time reduction contributes to a substantial solution of the problem of waiting time before the medium controller can be accessed. In addition, because it takes a long time to update the medium storage information in the medium controller with a large number of media in storage, the medium storage information is not necessarily updated each time a medium entry/exit-enable action occurs but the medium information is updated only when the operator thinks it necessary. Therefore, it is another object of the present invention to solve the problem of the discrepancy between medium storage information and the actual storage status. This is accomplished by the above-mentioned significant reduction in time for updating the medium information because this time saving makes it possible to automatically update the medium storage information when a medium entry/exit-enable action occurs.

According to a first aspect of the present invention, there is provided a medium controller storing a plurality of media, having a medium transfer unit to take a medium in and out of a storage place to read or write information on the medium and to transfer the medium to a place where reading and writing information is possible, and managing information about media in storage. This medium controller comprises slots for storing media; sensors, each mounted in each of the slots, for detecting whether or not there is a medium in the slot; a sensor manager for holding a log of status of the sensors in a period when media are likely to be taken in or out manually and deciding changes in the status of the sensors; and a medium information reader for reading medium information, which identifies a medium, from the medium, wherein when it is decided from a decision result by the sensor manager that the medium has been replaced, medium information is read by the medium information reader to thereby update medium storage information, or when it is decided that the medium has not been replaced, the medium storage information is not updated.

According to a second aspect of the present invention, a medium controller further comprises a door open detector for detecting that the door is open at the medium storage place of the medium controller; a door closed detector for detecting that the door is closed; a first memory for storing medium management information showing what media are stored in which slots; and a second memory for storing medium management information showing what media are stored in which slots at the moment when the door close detector detects that the above-mentioned entry/exit door is closed, wherein the medium storage information is updated by writing the medium information, which was read in by the medium information reader, in the first and second memories.

According to a third aspect of the present invention, there is provided a medium controller, wherein the sensor manager comprises a sensor status holder for storing the current sensor status of the respective slots; a log tracer for holding a log of the sensor status of the respective slots when it is found from contents of the sensor status holder that the entry/exit door is opened; and a log, trace determiner for checking status changes in sensors from contents of the log tracer, wherein supposing that a sensor status that a medium exists is designated as ON and a sensor status that a medium does not exist is designated as OFF, when a decision result of the sensor status decision unit is OFF→ON or ON→ON, the medium information is read in by the medium information reader and when a decision result is ON→OFF, the medium information is erased and when a decision result is OFF→ON→OFF or that the sensor status remains unchanged, the medium information is not read in by the medium information reader.

According to a fourth aspect of the present invention, there is provided another medium controller storing a plurality of media therein, having a medium transfer unit to take a medium in and out of a storage place to read or write information on the medium and to transfer the medium to a place where reading and writing is possible, and managing information about media in storage. This medium controller comprises slots for storing media; magazines each including a plurality of the slots; sensors, each mounted in each of the magazines, for detecting whether or not a medium has been removed from or stored in a slot; a sensor manager for deciding detection results of sensors in a period when media are likely to be taken out or stored manually; and a medium information reader for reading medium information, which identifies a medium, from the medium, wherein when it is decided from a decision result by the sensor manager that the medium has been replaced, medium information is read by the medium information reader to thereby update the medium storage information, or when it is decided that the medium has not been replaced, the medium storage information is not updated.

According to a fifth aspect of the present invention, yet another medium controller further comprises a door open detector for detecting that the door is open at the medium storage place of the medium controller; a door closed detector for detecting that the door is closed; a first memory for storing medium management information showing what media are stored in which slots; and a second memory for storing medium management information after log tracing showing what media are stored in which slots at the moment when the door open detector detects that the above-mentioned entry/exit door is open, wherein the medium storage information is updated by writing the medium information, which was read in by the medium information reader, in the first and second memories.

According to a sixth aspect of the present invention, there is provided a control method for use in a medium controller storing a plurality of media therein, having a medium transfer unit to take a medium in and out of a storage place to read or write information on the medium and to transfer the medium to a place where reading and writing is possible, and managing information about media in storage. This method comprises the steps of skipping an updating of medium storing information when a status of a sensor remains unchanged in a period when media are likely to be removed and stored manually, said sensor being mounted in each slot where a medium is stored and detecting whether or not there is a medium in the slot; and updating the medium storing information by reading medium information from the medium via medium information reading means when a change is found in the status of the sensor from a sensor status log and it is decided from contents of said log that the medium has been replaced.

According to a seventh aspect of the present invention, there is provided another control method for use in a medium controller storing a plurality of media therein, having a medium transfer unit to take a medium in and out of a storage place to read and write information on the medium and to transfer the medium to a place where reading and writing information is possible, and managing information about media in storage. This method comprises the steps of skipping an updating of medium storing information when a sensor does not detect a medium is removed from or stored in a magazine in a period when media are likely to be stored into and removed from storage, said sensor being installed in the magazine having a plurality of slots each storing a medium therein and detecting the removal or storing of the medium; and updating medium storing information by reading medium information from the medium in all slots in the magazine via medium information reading means when said sensor detects the storing or removal of the medium and it is decided from detected contents that the medium has been replaced.

When a medium entry/exit-enable action occurred, the medium controller according to the present invention confirms the spot in the medium storage where the sensor status has changed from that before the entry/exit-enable action. If there has not been any change in the status of the sensor, the medium storage information is regarded as unchanged after the entry/exit-enable action took place and the information is not updated.

On the other hand, if a change is found in the status of the sensor, the medium controller confirms changes in the sensor status of the respective slots, and updates medium storage information of only those slots where the sensor status has changed, and uses this updated information as information after a medium went out and came in.

More specifically, the medium storage information is updated according to the contents of the status changes of sensors. When a medium is in the slot, let the sensor be ON and when there is no medium in the slot, let the sensor be OFF. For example, suppose that the medium controller may be able to recognize as follows. When the sensor switches from ON to OFF, the medium has been removed from the slot. When the sensor switches from OFF to ON, a medium has been put in the slot. When the sensor switches from ON to OFF to ON, the medium has been replaced and finally put. When the sensor switches from OFF to ON to OFF, a medium has been temporarily put in the slot and finally removed. If the medium controller can manage medium storage information as mentioned above, when the sensor switches from ON to OFF (the medium has been removed from the slot), the medium controller may erase medium storage information in the slot. When the sensor switches from OFF to ON to OFF (the medium has been eventually removed), because the medium storage information remains unchanged between before and after removal and entry of a medium, the medium controller may not update the medium storage information. When the sensor switches from OFF to ON (a medium has been put in the slot) and when the sensor switches from ON to OFF to ON (the medium has been replaced), the medium controller may check the medium storage status for any change with a sensor or a bar-code reader attached to the medium transfer unit, in other words, may read medium information by which to determine a medium that replaced the previous (hereafter referred to as medium information), and may enter medium information after the change in medium storage information. By this procedure, medium storage information can be updated accurately with a minimum of action.

If the medium controller automatically updates medium storage information as described above, processing time can be reduced markedly. Also with a medium controller managing a very large number of media in storage, even if medium storage information is updated when a medium entry/exit-enable action occurs, a waiting time in which the medium controller cannot be accessed from the system can be shortened substantially. For this reason, it is possible to make a setting such that updating of medium storage information by managing sensor status is executed automatically without relying on the operator.

Because the provision of sensors for individual slots costs a large sum of money, it is possible to install sensors at the rate of one sensor for each group of a certain number of slots (e.g., one for each magazine). This method of allocation can be implemented as follows. For example, in a case where a sensor is installed for each magazines, the medium controller checks the status of the sensor on each magazine, and then checks the medium storage status at all slots of the magazine, where a sensor status changed, with a sensor or a bar-code reader attached to the medium transfer unit, and subsequently updates medium storage information.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 6 is a medium storage information table of the present invention; and

FIG. 7 is a sensor status log table of the present invention.

DESCRIPTION OF THE PREFERRED EMBODIMENTS

Figure 5:
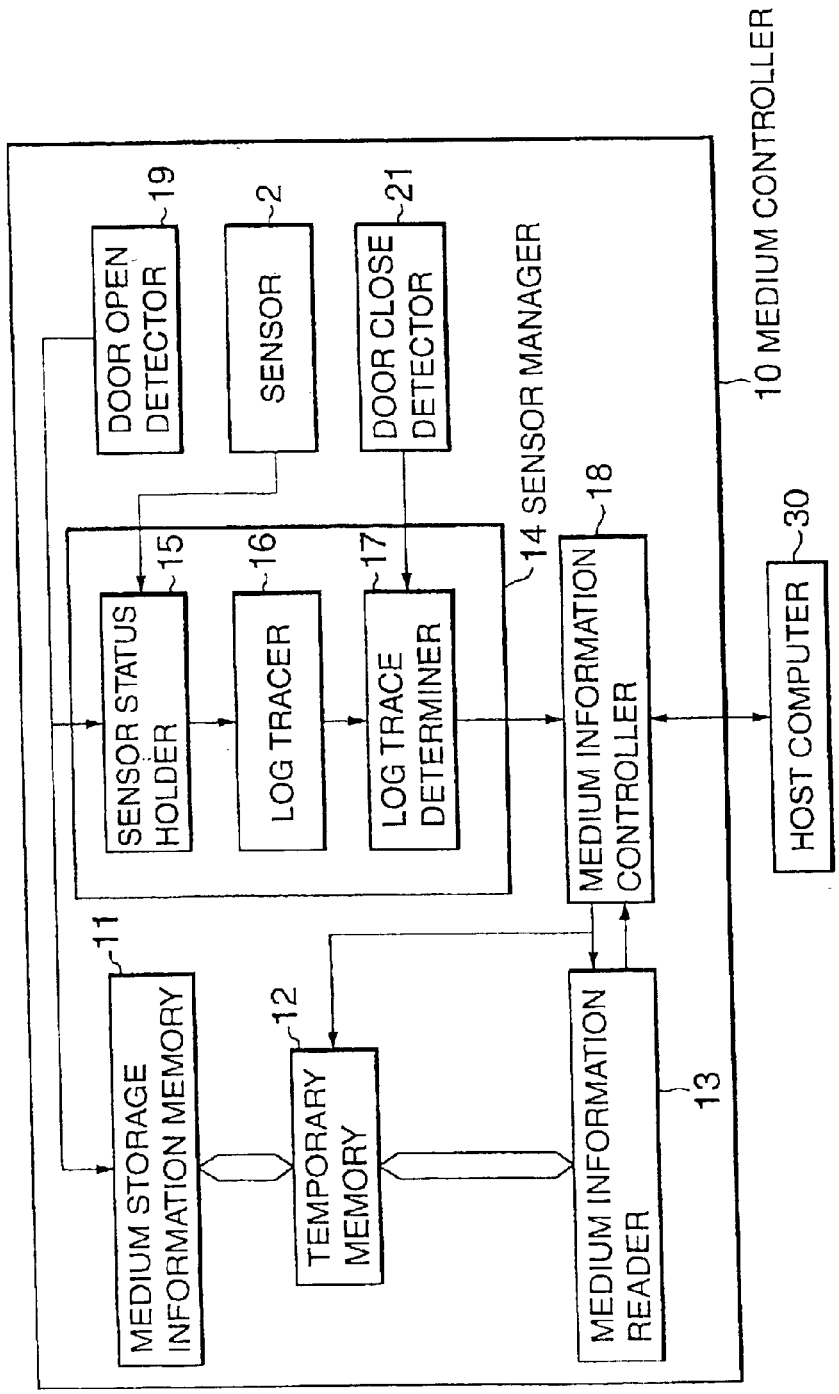
FIG. 5 is a block diagram showing the first embodiment of the present invention.

The configuration of a first embodiment of the present invention will be described with reference to FIG. 5. The medium controller according to the present invention stores many media therein and is provided with a medium transfer unit to move a medium from the storage place to a position where the medium can be taken out or put into storage or data can be read and written on the medium. The medium controller includes a door open detecting means 19 for detecting that the entry/exit door is open; a door closed detector 21 for detecting that the entry/exit door is closed; sensors 2, each mounted in a slot, for deciding whether or not there is a medium in the slot; a medium storage information memory 11 for storing medium management information showing what medium is stored in each slot; a temporary memory 12 for receiving and temporarily storing medium management information at the moment when the door open detecting means 19 detects that the entry/exit door is open; sensor managing means 14 for monitoring the output of the sensors 2 to find a change in the status of the sensors 2; medium information reading means 13 for reading medium information from the medium to be identified, and a medium information controller 18 which causes the medium information reading means 13 to read medium information when it is required from a decision by the sensor managing means 14 to update the medium information and which requires the temporary memory 12 to update the medium storage information based on the medium information, and also requires the medium storage information memory 11 to update its contents stored.

As an example of medium information, FIG. 6 shows medium storage information organized as a media storage information table in which the slot locations are associated with stored, different pieces of information used to determine media (hereafter referred to as medium information). The sensor managing means 14 includes a sensor status holder 15 for storing the current status (ON when there is a medium; OFF when there is no medium) of the sensor 2 of each slot; a log tracer 16 for holding a log of the sensor status of each slot after the door open detector detects that the entry/exit door is opened; and a log trace determiner 17 for detecting status that the entry/exit door is closed changes in the sensors from contents of the log tracer 16.

FIG. 7 is a table showing the contents of the log tracer 16, that is, an example of a log of the sensor status. When the entry/exit door was opened, the status of the sensors were written in the spaces under the column title of the Sensor Status Log 1, and subsequently, every time the status of a sensor changed, the status of the sensors were written in the spaces at the corresponding slots of the columns of the Sensor Status Log 2, 3 and so on. For example, at the slot 3, the status of the sensor was initially ON, and switched to OFF and finally ON the moment the door closed detecting means 21 detected that the door was closed. This sequence corresponds to a case where initially a medium was stored, and then the operator opened and closed the door, during which the medium was replaced by another medium. Of course, the result is the same when the same medium was dismounted and put back in the same place. Even if this is the case, it is safer if the medium is regarded as replaced.

The log trace determiner 17 checks which of the patterns shown below the status transition of each slot belongs by referring to the table showing the log of sensor status transitions. The status transitions are: ① OFF→ON (e.g., slot position 2 in FIG. 7); ② ON→OFF→ON (e.g., slot position 3); ③ ON→OFF (e.g., slot position 1); ④ OFF→ON→OFF (e.g., slot position 4); ⑤ the case where the status transition of a sensor does not occur. In other words, the sate of a sensor continues to be OFF and does not switch to ON (e.g., slot position 6) or the sensor status continues to be ON and does not switch to OFF (e.g., slot position 7). For example, the case of slot 5 corresponds to a case where a medium was replaced with another medium, which was further replaced with a third medium, but in this case, to know the final status, knowing that the third medium is in the slot 5 is enough and it should be decided that the transition in this case is the same as the transition of OFF→ON in the transition ①. In the transitions ④ and ⑤, there was no medium either at the beginning or the end, and there being no difference in subsequent treatment of these cases, these cases may be categorized as the same pattern of status transition. In the cases ①, ③, ④ and ⑤, the transition pattern can be known from the initial and final sensor status. Only in the case ②, the intermediate status is checked, and if it is found to be OFF, a decision may be made that this status transition ② corresponds to the pattern ③, or if the intermediate status is found to be not OFF, the status transition ② corresponds to the pattern ⑤.

Figure 1:
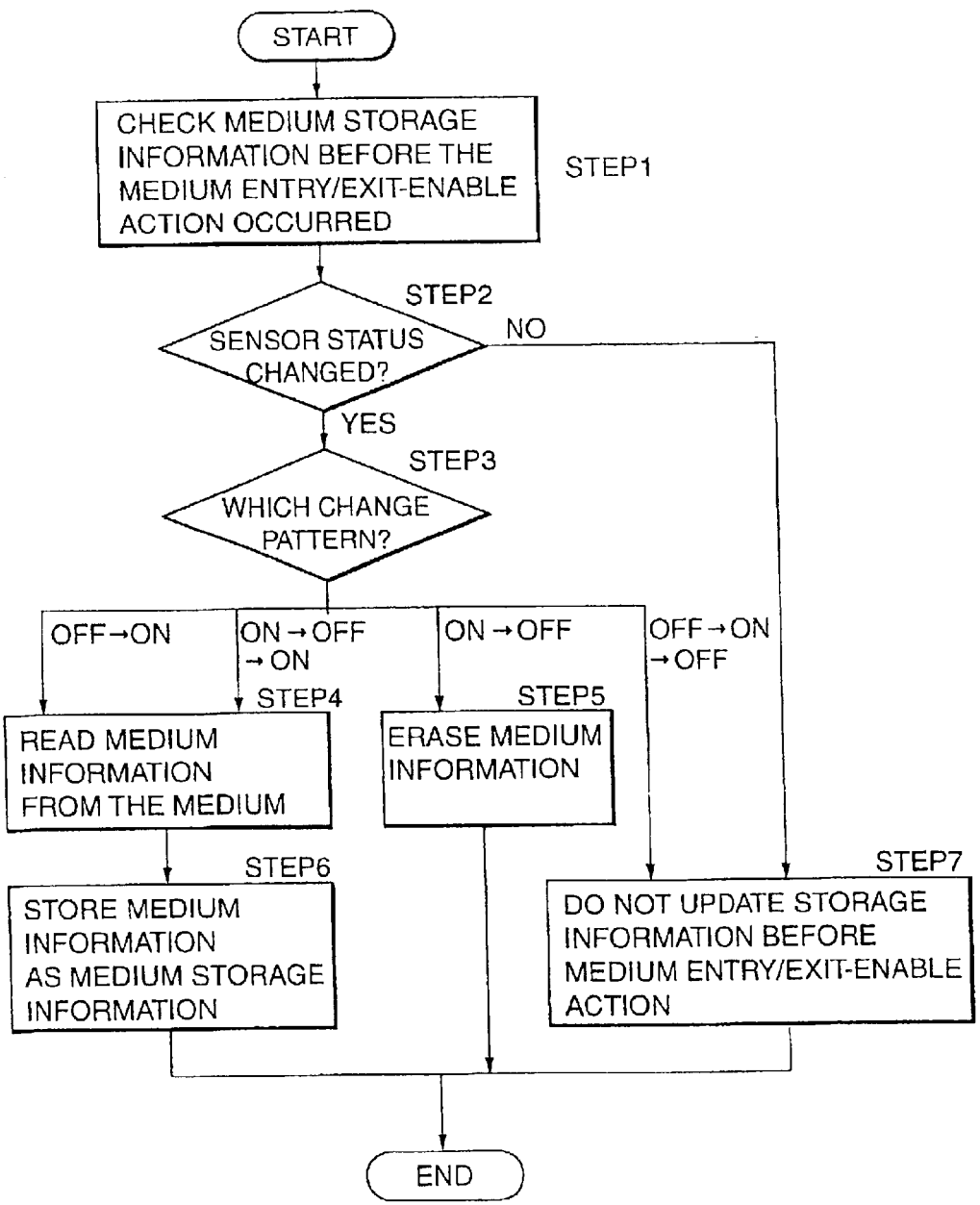
FIG. 1 is a flowchart of a first embodiment of the present invention.
Figure 3:
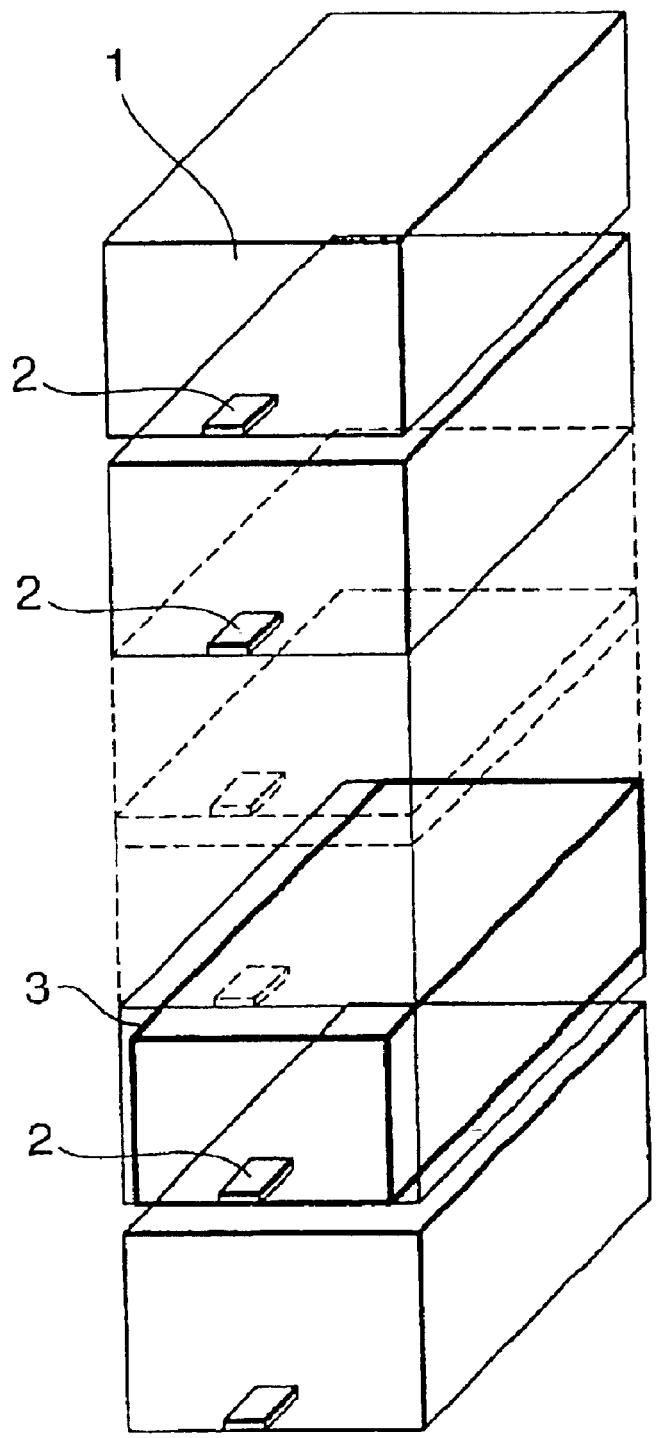
FIG. 3 is a conceptual diagram showing the structure of the first embodiment of the present invention.

Description will now be made of the operation of the first embodiment with reference to FIG. 1. FIG. 1 is a flowchart of the updating process of medium storage information when sensors are mounted at all and individual slots. The sensors to be mounted are any of those which can decide whether or not there is a medium in the slot (such as an optical sensor, a contact sensor, or a weight sensor). FIG. 3 shows sensors 2, which are for example contact sensors attached to the slots. The medium controller provided with the sensors 2, on receiving output from the door open detecting means 19, recognizes that a medium entry/exit-enable action, then checks medium storage information before the medium entry/exit-enable action occurred and writes the medium storage information in the temporary memory 12 (Step 1). The medium controller records status changes in the sensors in the log tracer 16 while the door is open. When the door closed detecting means 21 detects that the door is closed, the log trace determiner 17 decides from contents of the log tracer 16 whether or not there is a change in the status of the sensors 2 of the slots (Step 2).

When it has been confirmed that there is no change in the status of the sensors, medium storage information after a medium went out and a medium came in is not updated, so that medium storage information before exit or entry of medium is maintained as it is (Step 7). If it could be confirmed that there is some change in the status of a sensor 2 in Step 2, decision is made to which patterns shown below the status transitions of sensors 2 at the respective slots belong (Step 3). When a decision is made that the sensor status shifted as ON→OFF, the medium is regarded as removed, and the associated medium information is erased from medium storage information (Step 5). If it is decided that the sensor status shifted as OFF→ON→OFF, the medium is regarded as stored in the slot but eventually taken out, so that medium storage information is not updated (Step 7).

If it is decided that the sensor status shifted as OFF →ON, the medium is regarded as stored in the slot, or if it is decided that the sensor status shifted as ON→OFF→ON, the medium is regarded as having been replaced. Consequently, the medium transfer unit moves to the position of the corresponding slot and a sensor (different from the one installed in the slot, but not shown) or a bar-code reader installed on the medium transfer unit is used to read and recognize new medium information (Step 4). Medium storage information, checked at Step 1 and recorded in the temporary memory 12, has the change-affected portion only updated and becomes new medium storage information after the medium went out and came in (Step 6). Steps 2 to 6 are sequentially executed for all slots (sensors 2), and by writing the contents of the temporary memory 12 in the medium storage information memory 11, the process is completed.

The important point to note is that with the slots other than those whose sensors are judged to have shifted as OFF →ON or ON→OFF→ON, it is not necessary to execute the process at Step 4 of reading medium information from the medium. This reduces the mechanical movement of the medium transfer unit, which results in a notable effect of increased processing speed.

Figure 2:
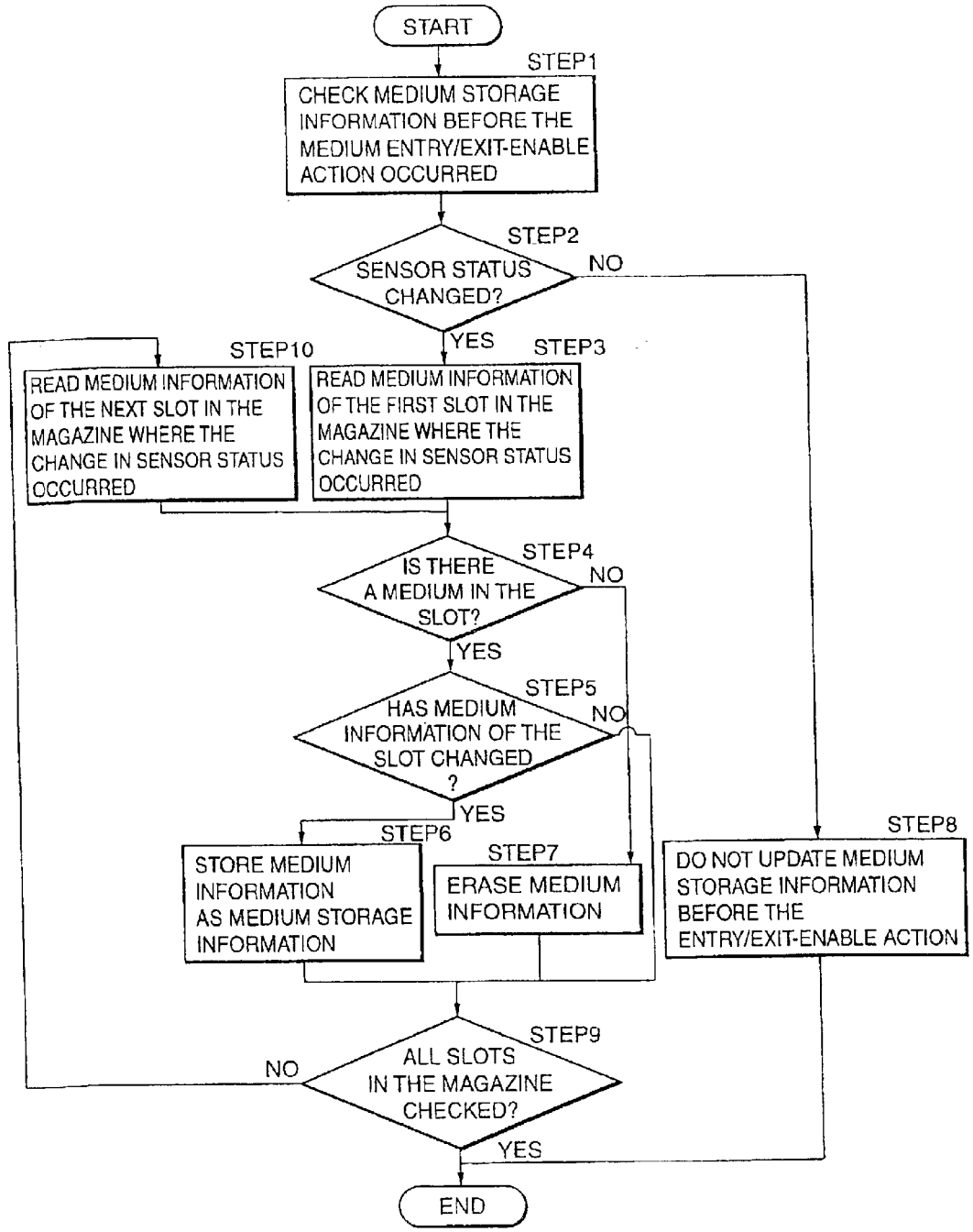
FIG. 2 is a flowchart of a second embodiment of the present invention.
Figure 4:
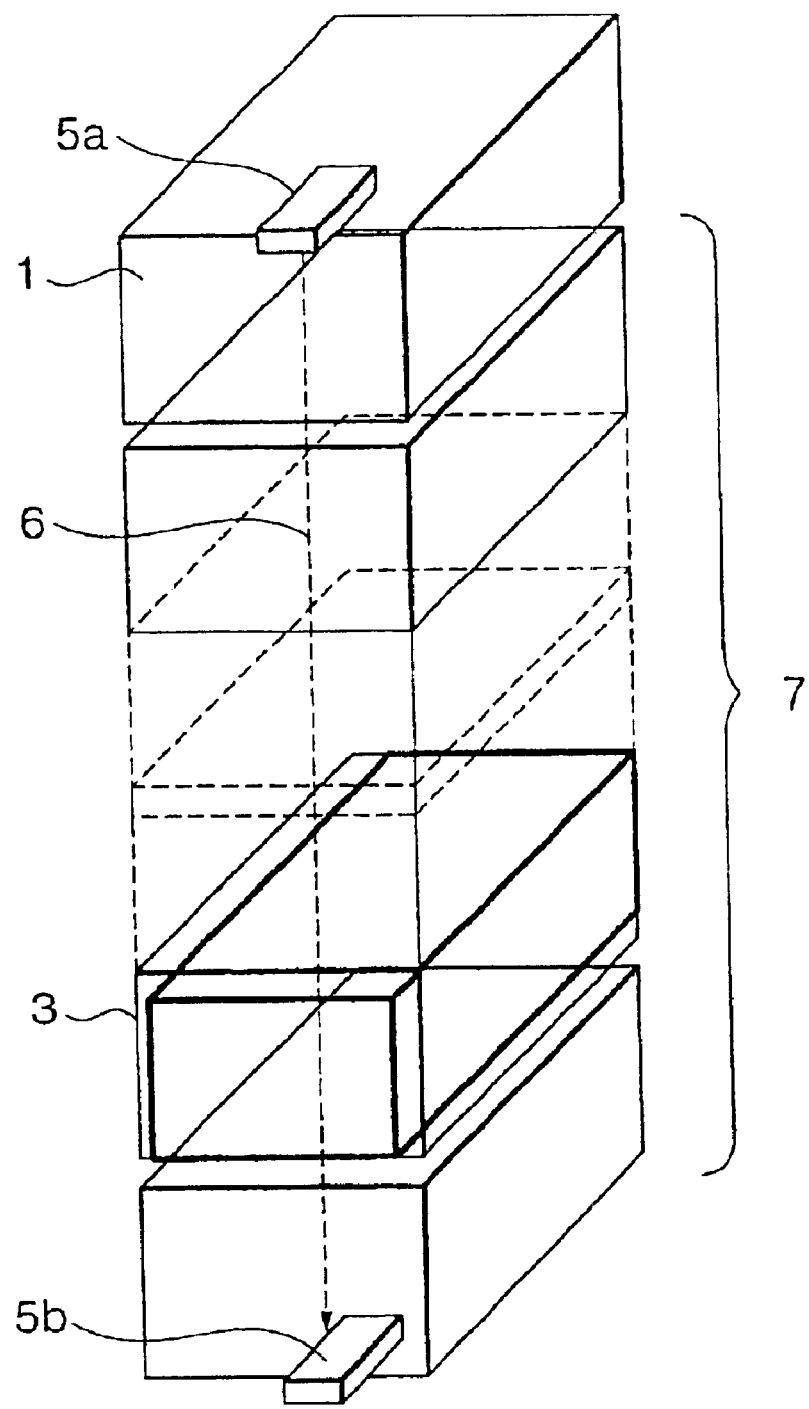
FIG. 4 is a conceptual diagram showing the structure of the second embodiment of the present invention.

Description will next be made of a second embodiment of the present invention with reference to the configuration of the system in FIG. 5 and the flowchart in FIG. 2. FIG. 2 is a flowchart of the updating process of medium storage information in a case where a sensor is mounted on each magazine. Referring to FIG. 4, the sensor 5 has a photosensing device installed at the entrance side of the slots of the magazine to detect incoming and outgoing of a medium. More specifically, the sensor 5 comprises a photoemitter 5a and a photodetector 5b to detect a medium 3 passing across the optical path of light 6 emitted from the photoemitter 5a. When a medium 3 passed, the sensor managing means 14 shown in FIG. 5 recognizes that a medium entry/exit action took place. In the case of the second embodiment, there are two kinds of status changes for one sensor: whether a medium entry/exit-enable action occurred or not. Therefore, the log tracer 16 in the sensor managing means 14 in FIG. 5 may be omitted.

When the medium information controller 18 recognizes that a medium entry/withdraw-enable action occurred, it checks medium storage information before the medium entry/withdraw-enable action (Step 1). Subsequently, a check is made to see if the status of the sensor 5 of the slot has changed (Step 2). If it is confirmed that there is no change in the status of the sensor, medium storage information before the medium input/output enable action is not updated as in FIG. 1 (Step 8). For the magazine 7 in which a medium blocked the light of the optical sensor 5 attached to the magazine 7, the status of medium change is checked for all slots of the magazine by the medium information reading means 13 through a sensor mounted on the medium transfer unit (not shown) or a bar-code reader (not shown) (Steps 4 and 5).

The whole medium storage information in the magazine may be updated. Alternatively, however, a decision is made for each slot as shown in FIG. 2, and if the decision is that a medium does not exist (Step 4), medium information is erased (Step 7). On the other hand, if the decision is that there is a medium in the slot (Step 4), a decision is made whether or not medium information of the slot has changed, and if the decision is that the medium information remains the same, it is concluded that the medium information need not be rewritten as far as this slot is concerned and this Step is carried out for the next slot (Steps 9 and 10), and if the decision is that the medium information has changed, the medium information that has been read is written in the temporary memory 12 so that medium storage information is updated (Step 6). After this, if all slots in the magazine have not been checked (Step 9), medium information of the next slot is read (Step 10), and a decision is made whether or not a slot is stored in the next slot (Step 4). Subsequently, this procedure is repeated until all slots have been checked. When all slots in the magazine have been checked (Step 9), the process for this magazine is finished. When the process for one magazine is finished and if there is another magazine where there were outgoing and incoming of a medium, the same process is executed on this magazine.

Besides the above-mentioned optical sensor, another method by which to make the medium controller to decide whether a medium went in and out is by a weight sensor, which detects a change in the weight of the magazine.

If medium information is updated every time a medium goes out of or into the magazine, accurate and quick updating of medium storage information can be achieved. More specifically, when a medium input/output-enable action occurred, inquiry is made only of the place where a change occurred (into all slots of the change-involved magazine) without checking all medium storage places (slots) with a sensor or a bar-code reader mounted on the medium transfer unit. In other words, it is not necessary to check the slots of the magazine where no change occurred, with a sensor or through bar codes and accordingly, processing speed becomes faster than in prior art.

Supplementary explanation of the preferred embodiments and applications of the present invention will be given in the following.

Description will be made of how the sensors 2 are mounted. FIG. 3 shows an example wherein switch sensors 2 are mounted in all slots and FIG. 4 shows an example wherein an optical sensor 5, consisting of a sensor photoemitter 5a and a sensor photodetector 5b, is mounted at the medium entrance of the magazine, both of which can be realized easily. Mounting sensors in individual slots costs a large amount of money, but if an optical sensor is mounted for each magazine as shown in FIG. 4, this arrangement is less expensive. In FIG. 3, the condition that a sensor is pressed by a medium placed in the medium storage place is designated as ON and the condition that a sensor is not pressed by a medium because there is no medium in the storage place is designated as OFF. In FIG. 4, when light 6 emitted by the photoemitter 5a is blocked in a given magazine, the medium controller can recognize that a medium went in or out of some slot in the magazine.

Next, description will be made of cases where the present invention can be applied. There is a risk that the medium controller is unable to obtain medium storage information because of some human intervention, for example, in the input or output of a medium to or from medium storage for medium managing or in the maintenance work of the medium controller. When there is human intervention, any of the actions occurs, such as opening and closing of the entry/exit door, stopping or supplying power to the medium controller. The medium controller can detect the occurrence of those events easily by well-known technology.

When there is human intervention in the operation of the medium controller, in other words, when the medium entry/exit door is opened and then closed, or the power to the medium controller is turned off then on, or system reset, the medium controller recognizes that any of those events took place, by using well-known technology. By replacing the door open detecting means 19 in FIG. 5 by human intervention detecting means, a reset system action and medium controller power off-on action being taken can be considered to be the same as the entry/exit door being opened or closed. Then, when the entry/exit door was opened or closed and a reset system action and a medium controller power off-on action was taken, the medium controller calls a medium storage information table from the medium storage information memory 11 into the temporary memory 12. Subsequently, the log trace determiner of the sensor managing means 14 finds a change in the sensor 2 to recognize that a medium was taken in or out, and updates only the change-related portion of medium storage information in the temporary memory 12. After human intervention, whenever a job is executed by the host computer and consequently medium storage information is updated, medium storage information in the temporary memory 12 is updated. After the job is terminated, medium storage information of the latest version is stored in the medium storage information memory 11.

When the power was switched off and if power supply for the process shown in FIG. 1 is provided as a separate system and can be used, the same operation as mentioned above can be performed. Even if power supply is not provided as a separate system, it is possible to grasp just like the medium status when the power is switched off and on. Namely, door open operation is replaced with power off operation and door close operation is replaced with power on operation and in FIG. 5 and a door close detector 21 is replaced with power on detector, after power is switched on, medium information before power off operation is put in the sensor status holder and medium information after power on operation is put in the log holder. Then medium information is updated in log tracer determiner, and it is easy to determine status changes.

In updating medium information proposed by the present invention, accurate and high-speed updating of medium storage information can be achieved by checking only the place where a change occurred (a slot in the first embodiment in FIG. 3 or a magazine in the second embodiment in FIG. 4) without having to check all slots with a sensor or a bar-code reader attached to the medium transfer unit when a medium storage/exit-enable action took place.

In the process for updating medium storage information according to the present invention, as has been described, a medium controller is used, which includes means for recognizing, for example, that the entry/exit door is opened or closed and that power supply for the medium controller is disconnected or supplied, and simple sensors arranged at individual slots and each capable of recognizing whether or not a medium is stored in the slot or sensors arranged at individual magazines and each capable of recognizing whether or not a medium is put in or taken out of the slot. Therefore, when a medium entry/exit-enable action took place, the process for updating medium storage information need not check all slots with a sensor or a bar-code reader arranged on the medium transfer unit, but has only to check the place where a change occurred (a slot or a magazine) to update medium storage information. This configuration allows medium storage information to be updated easily, accurately, and speedily.

Therefore, time required for updating medium storage information can be shortened sharply, with the result that the present invention offers an effect to solve the problem that the medium controller is made to wait and cannot execute other processes while the medium transfer unit accesses all the slots each time a medium comes in or goes out. In a medium controller with a large number of media in storage, in which time-consuming medium-storage-information updating job is done by an operator, the present invention makes it possible to automatically update medium storage information without intervention by the operator after a medium entry/exit-enable action took place, and thus precludes the problem that medium storage information does not agree with the actual storage status.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A medium controller storing a plurality of media therein, having a medium transfer unit to take a medium in and out of a storage place to read or write information on the medium and to transfer the medium to a place where reading and writing information is possible, and managing information about media in storage, comprising:

slots for storing media;

sensors, each mounted in each of the slots, for detecting whether or not there is a medium in said slot;

a sensor manager for holding a log of status of said sensors in a period when media are likely to be taken in or out manually and deciding changes in the status of said sensors; and a medium information reader for reading medium information, which identifies a medium, from the medium, wherein when it is decided from a decision result by said sensor manager that the medium has been replaced, medium information is read by said medium information reader to thereby update medium storage information, or when it is decided that the medium has not been replaced, said medium storage information is not updated.

2. A medium controller according to claim 1, further comprising:

a door open detector for detecting that the door is open at the medium storage place of the medium controller;

a door closed detector for detecting that the door is closed;

a first memory for storing medium management information showing what media are stored in which slots; and a second memory for storing medium management information showing what media are stored in which slots at the moment when said door close detector detects that said entry/exit door is closed, wherein said medium storage information is updated by writing said medium information, read in by said medium information reader, in the first and second memories.

3. A medium controller storing a plurality of media therein, having a medium transfer unit to take a medium in and out of a storage place to read or write information on the medium and to transfer the medium to a place where reading and writing information is possible, and managing information about media in storage, comprising:

slots for storing media;

sensors, each mounted in each of the slots, for detecting whether or not there is a medium in said slot;

means for deciding changes in status of the sensors in a period when media are likely to be taken in or out manually; and means for reading medium information, which identifies a medium, from the medium, wherein when it is decided from a decision result by said means for deciding changes in the status of the sensors that the medium has been replaced, medium information is read by means for reading medium information to thereby update medium storage information, or when it is decided that the medium has not been replaced, said medium storage information is not updated.

4. A medium controller according to claim 3, further comprising:

means for detecting that the door is open at the medium storage place of said medium controller;

means for detecting that said door is closed;

first memory means for storing medium management information showing what media are stored in which slots; and second memory means for storing medium management information showing what media are stored in which slots at the moment when said door close detecting means detects that said entry/exit door is closed, wherein said medium storage information is updated by writing said medium information, read into by said medium information reading means, into said first and second memory means.

5. A medium controller according to claim 1, further comprising:

a door open detector for detecting that the door is open at the medium storage place of the medium controller;

a door closed detector for detecting that the door is closed;

a first memory for storing medium management information showing what media are stored in which slots; and a second memory for storing medium management information showing what media are stored in which slots at the moment upon said door close detector detecting that said entry/exit door has closed, wherein said medium storage information is updated by writing said medium information, read in by said medium information reader, in the first and second memories.

6. A medium controller according to claim 3, further comprising:

means for detecting that the door is open at the medium storage place of said medium controller;

means for detecting that said door is closed;

first memory means for storing medium management information showing what media are stored in which slots; and second memory means for storing medium management information showing what media are stored in which slots at the moment upon said door close detecting means detecting that said entry/exit door has closed, wherein said medium storage information is updated by writing said medium information, read into by said medium information reading means, into said first and second memory means.

7. The controller of claim 1, wherein the medium information reader comprises a barcode reader.

* * * * *

UNITED STATES PATENT AND TRADEMARK OFFICE
CERTIFICATE OF CORRECTION

PATENT NO. : 6,917,570 B2
DATED : July 12, 2005
INVENTOR(S) : Morisaki

Page 1 of 1

It is certified that error appears in the above-identified patent and that said Letters Patent is hereby corrected as shown below:

Title page,
Item [30], Foreign Application Priority Data, change "10-271539" to -- 11-271539 --.

Signed and Sealed this

Twentieth Day of September, 2005

JON W. DUDAS
*Director of the United States Patent and Trademark Office*